UNITED STATES PATENT OFFICE.

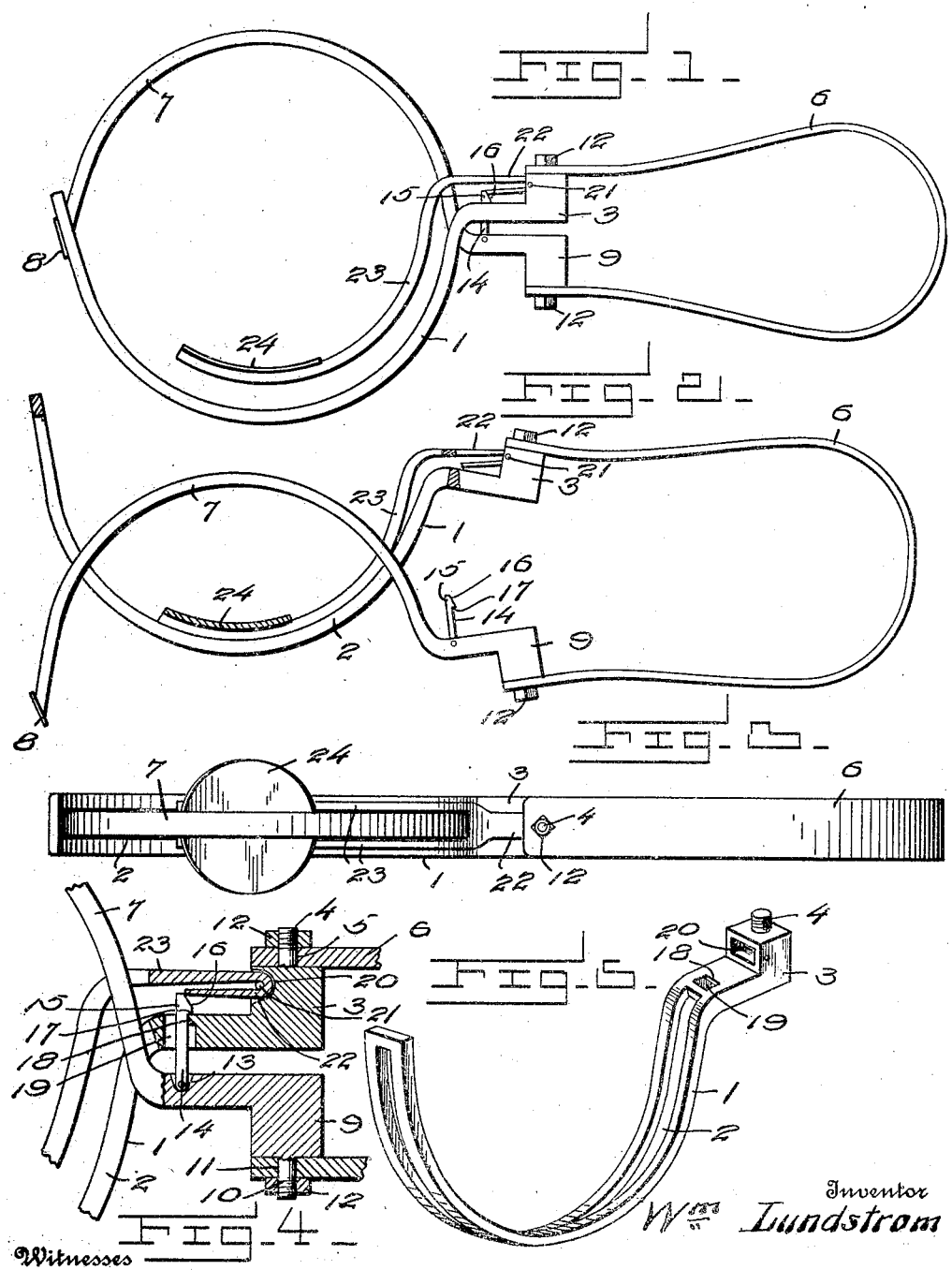

WILLIAM LUNDSTROM, OF MARGIE, MINNESOTA.

TRAP.

1,024,689.  Specification of Letters Patent.  Patented Apr. 30, 1912.

Application filed May 12, 1911. Serial No. 626,750.

*To all whom it may concern:*

Be it known that I, WILLIAM LUNDSTROM, a citizen of the United States, residing at Margie, in the county of Koochiching and State of Minnesota, have invented certain new and useful Improvements in Traps, of which the following is a specification.

My invention relates to improvements in traps, and has for its leading object the provision of a simple and inexpensive trap of the choker type particularly adapted for catching gophers, rats or other rodents.

A further object of the invention is the provision of an improved simple and efficient trap which may be readily and safely set without placing the hands between the jaws of the trap and which will be readily released to fly up and catch an animal between the jaws.

Other objects and advantages of my improved trap will be apparent from the following description taken in connection with the drawings, and it will be understood that I may make any modifications in the construction shown and described within the scope of the claim without departing from or exceeding the spirit of the invention.

Figure 1 represents a side elevation of my trap in set position. Fig. 2 represents a similar view thereof in sprung position with certain parts cut away. Fig. 3 represents a top plan view of the trap. Fig. 4 represents an enlarged sectional view through the jaw locking member. Fig. 5 represents a detailed view of one of the jaws.

In the drawings, the numeral 1 designates the lower jaw of the trap having the slot 2 formed therein and having the L-shaped arm 3 formed on one end terminating in the upwardly projecting lug 4 of reduced size which passes through the eye 5 formed in one end of the spring loop 6.

Having its ends engaged in the slot 2 and rounded therefrom to in connection with the jaw 1 form a complete circle is the upper jaw 7 having the enlargement 8 on one end to prevent the said end from passing out of the slot and having the L-shaped arm 9 formed on the other end and terminating in the reduced lug 10 which passes through the eye 11 in the other end of the spring 6, nuts 12 being engaged on the lugs 4 and 10 to secure the spring to the ends of the jaws.

It will thus be seen that the force of the spring 6 tends to normally hold the curved jaws 1 and 7 with the central portions of their curves together and their ends diverging from each other, while to lock the trap in set position and hold the jaws apart against the tension of the spring, I pivotally secure in the recess 13 formed in the arm 9 of the upper jaw the end of the pin 14, the upper end of said pin having the enlarged head 15 with the rear beveled face 16 and the under shoulder 17 to fit over the lip 18 of the arm 3 of the lower jaw, the head of the pin projecting upward through a recess or socket 19 in said arm 3 and the engagement of the shoulder 17 with the lip 18 serving to lock the jaws in opened position against the tension of the spring 6.

To move the pin 14 to release the lip 18, I pivotally secure in the recess 20 of the arm 3 by the pin 21 the loop 22 of the arms 23 which extend along the two portions of the jaw 1 and have secured to their lower ends the trip pan 24. The other end of the loop 22 is so disposed as to rest at the upper edge of the beveled face 16 of the head of the locking pin while the pan is raised above the lower jaw. Upon pressure on the pan the end of the loop 22 swings downward on the pivot and exerts a camming force against the pin 14 to force it out of locking engagement with the shoulder 18 to allow the jaws to move into closed position as shown in Fig. 2, the jaws gripping therebetween the animal which has depressed the pan.

From the foregoing description taken in connection with the drawings, the construction of my trap and its operation will be readily understood, and it will be seen that I have provided a simple and efficient trap comprising a pair of jaw members having extended arms to which is secured a spring for forcing the arms apart to bring the jaws together, and it will further be seen that I have provided an improved locking device for securing the arms of the trap together against the tension of the spring, whereby the trap may be readily set without the danger of catching the hands therein which is present when setting ordinary spring traps.

Claim:

A trap comprising upper and lower spring pressed jaws, the lower jaw having a slot formed throughout its length and in which the upper jaw operates, an enlargement formed upon the upper end of the upper jaw to prevent the same from passing out of the slot, a locking pin pivotally connected to the inner end of the upper jaw, and having a head, the rear surface of which is beveled, a shoulder carried by the head, a slot formed near the inner end of the lower jaw and having a lip projecting therein, a trip lever pivotally connected in the recess formed in the lower jaw the pivoted end of the lever being bent outwardly and adapted to rest against the upper end of the inclined rear surface of the head of the pin when the shoulder carried thereby rests upon said lip, whereby when pressure is applied to said lever, the outwardly bent end thereof will ride downwardly upon the beveled surface of the head of the pin and force said shoulder from engagement with the lip thereby springing both jaws.

In testimony whereof I affix my signature, in the presence of two witnesses.

WILLIAM LUNDSTROM.

Witnesses:
A. J. ANDERSON,
A. J. HANSEN.